(12) United States Patent
Molloy et al.

(10) Patent No.: US 12,506,610 B2
(45) Date of Patent: Dec. 23, 2025

(54) TRANSACTION SIGNATURE FLAGS

(71) Applicant: nChain Licensing AG, Zug (CH)

(72) Inventors: Katharine Molloy, London (GB);
Craig Steven Wright, London (GB);
Owen Vaughan, London (GB)

(73) Assignee: nChain Licensing AG, Zug (CH)

(*) Notice: Subject to any disclaimer, the term of this patent is extended or adjusted under 35 U.S.C. 154(b) by 164 days.

(21) Appl. No.: 18/268,869

(22) PCT Filed: Nov. 23, 2021

(86) PCT No.: PCT/EP2021/082626
§ 371 (c)(1),
(2) Date: Jun. 21, 2023

(87) PCT Pub. No.: WO2022/135809
PCT Pub. Date: Jun. 30, 2022

(65) Prior Publication Data
US 2024/0106650 A1 Mar. 28, 2024

(30) Foreign Application Priority Data

Dec. 23, 2020 (GB) ..................... 2020452

(51) Int. Cl.
H04L 9/00 (2022.01)
H04L 9/30 (2006.01)
H04L 9/32 (2006.01)

(52) U.S. Cl.
CPC ............. H04L 9/3213 (2013.01); H04L 9/30 (2013.01); H04L 9/50 (2022.05); H04L 2209/463 (2013.01)

(58) Field of Classification Search
CPC ....... H04L 9/30; H04L 9/3247; H04L 9/3213; H04L 9/50; H04L 2209/463
See application file for complete search history.

(56) References Cited

U.S. PATENT DOCUMENTS 5,854,932 A 12/1998 Mariani et al.
6,430,305 B1 8/2002 Decker
(Continued)

FOREIGN PATENT DOCUMENTS

JP 2019526199 A 9/2019
WO 2020240297 12/2020

OTHER PUBLICATIONS

PCT/EP2021/082626 International Search Report and Written Opinion dated Jan. 25, 2022, 15 pages.
(Continued)

Primary Examiner — Mohammad A Siddiqi
(74) Attorney, Agent, or Firm — Messner Reeves LLP

(57) ABSTRACT

A computer program for generating an input and an output for a voting transaction for a blockchain for casting a vote, the computer program causes one or more processors to be configured to: receive voting instructions from a vote coordinator comprising one or more public keys and a set of voting options; render a user interface displaying the voting options; receive a user selection of one of the voting options; and generate an input-output pair for inclusion in a voting transaction; wherein a non-signature portion of the input comprises an outpoint identifying an unspent transaction output, and a signature portion of the input comprises a signature single flag and an associated signature signing at least the non-signature portion of the input-output pair and the output of the input-output pair but not any other output of the voting transaction, and the output of the input-output pair comprises one of public keys.

20 Claims, 10 Drawing Sheets

(56) References Cited

U.S. PATENT DOCUMENTS

| | | | |
|---|---|---|---|
| 11,943,331 B2* | 3/2024 | Bartolucci | G06Q 20/3825 |
| 12,047,443 B2* | 7/2024 | Zhang | H04L 9/3239 |
| 12,346,205 B2 | 7/2025 | Zhao et al. | |
| 2006/0289775 A1 | 12/2006 | Inbar | |
| 2012/0158729 A1 | 6/2012 | Mital et al. | |
| 2016/0267472 A1 | 9/2016 | Lingham et al. | |
| 2017/0232300 A1* | 8/2017 | Tran | G06F 1/163 |
| | | | 434/247 |
| 2017/0330174 A1* | 11/2017 | Demarinis | G06Q 40/04 |
| 2018/0350180 A1* | 12/2018 | Onischuk | G07C 13/00 |
| 2019/0116024 A1* | 4/2019 | Wright | H04L 9/3066 |
| 2019/0164153 A1* | 5/2019 | Agrawal | G06Q 20/065 |
| 2019/0213821 A1* | 7/2019 | Davis | H04L 9/3239 |
| 2019/0251270 A1* | 8/2019 | Liu | H04L 9/0618 |
| 2019/0268312 A1* | 8/2019 | Ma | H04L 63/123 |
| 2019/0354518 A1* | 11/2019 | Zochowski | G06F 16/2379 |
| 2022/0114583 A1* | 4/2022 | Nie | G06Q 20/389 |
| 2022/0138748 A1 | 5/2022 | Millar et al. | |
| 2024/0013213 A1* | 1/2024 | Trock | G06Q 20/401 |

OTHER PUBLICATIONS

Anonymous, "OP_Checksig—Bitcoin Wiki", Jan. 16, 2019 (Jan. 16, 2019), XP055657864, Retrieved from the Internet: URL: https://en.bitcoin.it/w/index.php?title=OP_CHECKSIG&oldid=66023 [retrieved on Jan. 14, 2020].

GB2020452.5 Combined Search and Examination Report dated Aug. 27, 2021, 11 pages.

Raghav Sood., "Bitcoin's Signature Types—SIGHASH", 2018, retrieved from the internet: URL: https://raghavsood.com/blog/2018/06/10/bitcoin-signature-types-sighash, accessed Aug. 30, 2020.

Craig S Wright, "A distribution protocol for dealerless secret distribution", White Paper, nCrypt Holdings Ltd, Jul. 12, 2016, 23 pages.

Michaella Pettit, "Shared Secrets and Threshold Signatures", White Paper, nChain Holdings Ltd, 2020, 23 pages.

Yunlei Zhao: "Practical Aggregate Signature from General Elliptic Curves, and Applications to Blockchain", Proceedings of the 2019 ACM Asia Conference on Computer and Communications Security, Asia CCS '19, Jul. 2, 2019 (Jul. 2, 2019), pp. 529-538, sections 2,3,5,6; tables 1-4 New York, New York, USA, URL: https:/dl.acm.org/doi/pdf/10.1145/3321705.3329826.

Ozyilmaz Kazim Rifat et al: "A Multi-protocol Payment System to Facilitate Financial Inclusion", Sep. 20, 2019 (Sep. 20, 2019), Computer Vision—ECCV 2020 : 16th European Conference, Glasgow, UK, Aug. 23-28, 2020 : Proceedings; Part of the Lecture Notes in Computer Science; Springer International PU, XP047523397, ISBN: 978-3-030-58594-5 [retrieved on Sep. 20, 2019] sections 2, 3; figure 1.

GB2020453.3 Combined Search Report and Abbreviated Examination Report dated Jun. 22, 2021, 8 pages.

PCT/EP2021/082664 International Search Report and Written Opinion dated Feb. 25, 2022, 15 pages.

Rosenbaum K., "9.5 Various Signature Types," Bitcoins, First Edition, Mar. 23, 2020, pp. 350-351.

* cited by examiner

Figure 5

| \multicolumn{4}{c}{TxID$_{tokenissue}$} | | | |
|---|---|---|---|
| Version | 1 | Locktime | 0 |
| In-count | 1 | Out-count | 4 |
| \multicolumn{2}{c}{Input List} | \multicolumn{2}{c}{Output List} | | |
| Outpoint | Unlocking Script | Value | Locking Script |
| $I_0$ | <Sig Coord : ALL> | $x_0$ satoshi | <signing condition> <P2PKH $P_{V1}$> |
| | | $x_1$ satoshi | <signing condition> <P2PKH $P_{V2}$> |
| | | $x_2$ satoshi | <signing condition> <P2PKH $P_{V3}$> |
| | | $x_3$ satoshi | <P2PKH $P_{coord}$> |

| TxID$_{vote}$ | | | |
|---|---|---|---|
| Version | 1 | Locktime | 0 |
| In-count | 4 | Out-count | 4 |
| Input List | | Output List | |
| Outpoint | Unlocking Script | Value | Locking Script |
| Tx$_{tokenissue}$ Index 0 | <Sig V1 : SINGLE> | $x_0$ satoshi | Address option 1 |
| Tx$_{tokenissue}$ Index 1 | <Sig V2 : SINGLE> | $x_1$ satoshi | Address option 3 |
| Tx$_{tokenissue}$ Index 2 | <Sig V3 : SINGLE> | $x_2$ satoshi | Address option 1 |
| $I_3$ | <Sig Coord : ALL> | $x_3$ satoshi | <P2PKH P$_{coord}$> |

| TxID$_{vote}$ | | | |
|---|---|---|---|
| Version | 1 | Locktime | 0 |
| In-count | 3 | Out-count | 3 |
| Input List | | Output List | |
| Outpoint | Unlocking Script | Value | Locking Script |
| Tx$_{tokenissue}$ Index 0 | <Sig V1 : SINGLE\|ACP> | $x_0$ satoshi | Address option 1 |
| Tx$_{tokenissue}$ Index 2 | <Sig V3 : SINGLE\|ACP> | $x_2$ satoshi | Address option 1 |
| $I_3$ | <Sig Coord : ALL> | $x_3$ satoshi | <P2PKH P$_{coord}$> |

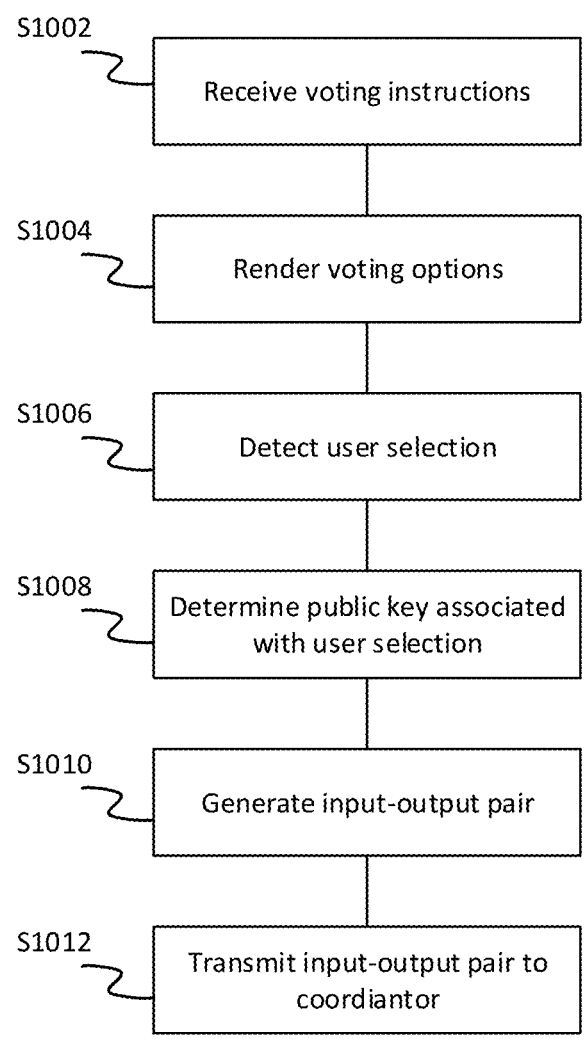

TRANSACTION SIGNATURE FLAGS

CROSS REFERENCE TO RELATED APPLICATIONS

This application is the U.S. National Stage of International Application No. PCT/EP2021/082626 filed on Nov. 23, 2021, which claims the benefit of United Kingdom Patent Application No. 2020452.5, filed on Dec. 23, 2020, the contents of which are incorporated herein by reference in their entireties.

TECHNICAL FIELD

The present disclosure relates to signature flags used in blockchain transactions.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicized. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

In blockchain transactions, signatures serve three purposes: to provide evidence of ownership of or legitimate control over the funds being spent, to authorize the spending, and to ensure the integrity of the transaction information. The third function ensures that specific details of the transaction cannot be changed without rendering the signature invalid. For instance, signing the outputs ensures that no one can intercept the transaction once it has been broadcast to the network and modify the address to which funds are assigned.

For certain output-based transaction models, typically, when signing a transaction, the signing party creates a signature that applies to all inputs and outputs defined in the transaction. However, by using different tags (known as sighash flags) when creating a signature, it is possible to make a signature specific so that it only applies to, or 'endorses', certain elements of the transaction.

In situations where multiple parties collaborate on a single transaction, a traditional sighash ALL signing approach requires some initial communication between parties to establish the transaction details before signing can proceed. This can be inefficient, and in many cases imparts a mutual dependency that does not accurately reflect the relationship between parties. In contrast, combining different sighash flags can provide parties with the flexibility to sign different parts of the transaction independently.

An example functionality in which such flexibility is of use is in a vote, in which each voter signs only the input and output relating to his vote. Votes can therefore be kept anonymous. Voting is not possible using the standard sighash ALL signing model as all inputs and outputs would need to be known prior to signing, providing voters with the opportunity to refuse to provide their signature if unhappy with the vote outcome and so invalidating the vote.

According to one aspect disclosed herein, there is provided a computer program for generating an input and an output for a voting transaction for a blockchain for casting a vote, the computer program stored on a non-transitory medium which, when executed by one or more computer processors, causes the one or more processors to be configured to: receive voting instructions from a vote coordinator comprising one or more public keys defined by the vote coordinator and a set of voting options; control a display to render a user interface displaying the set of voting options; receive a user selection of one of the voting options of the set of voting options defined by a user input at the user interface; and generate an input-output pair for inclusion in a voting transaction with one or more other input-output pairs at different indexes of the voting transaction; wherein a non-signature portion of the input of the input-output pair comprises an outpoint identifying an unspent transaction output of a blockchain transaction, and a signature portion of the input comprises a signature single flag and an associated signature signing at least the non-signature portion of the input-output pair and the output of the input-output pair but not any other output of the voting transaction, and the output of the input-output pair comprises one of the one or more public keys of the voting instructions.

According to a second aspect disclosed herein, there is provided a computer program for generating a voting transaction for a blockchain, the computer program stored on a non-transitory medium which, when executed by one or more processors, causes the one or more processors to be configured to: receive a plurality of input-output pairs; generate a voting transaction comprising: in each of a set of vote indexes, one of the received input-output pairs; and in an authorising index, an input comprising a signature of a vote coordinator with an all signature flag, such that the signature of the vote coordinator signs all of the inputs and outputs of the voting transaction, and an output; and transmit the voting transaction to a blockchain.

According to a third aspect disclosed herein, there is provided a blockchain transaction embodied on computer-readable media and comprising: an input for validly spending a spendable transaction output indicated in the input of the blockchain transaction; and at least one output comprising a piece of locking script defining a signature requirement and a required signature flag and which, when concatenated with a piece of unlocking script in a subsequent blockchain transaction, validates a signature of the unlocking script, extracts a used signature flag from the unlocking script and compares the used signature flag to the required signature flag, such that the subsequent blockchain transaction is invalid if the used signature flag does not match the required signature flag and/or the signature is invalid.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 5 is an example token issuing transaction, FIG. 6 is an example voting transaction for a vote requiring all eligible voters to cast a vote, FIG. 7 is an example voting transaction for a quorum vote, FIG. 10 shows an example method of voting.

DETAILED DESCRIPTION OF EMBODIMENTS

Example System Overview

Figure 1:
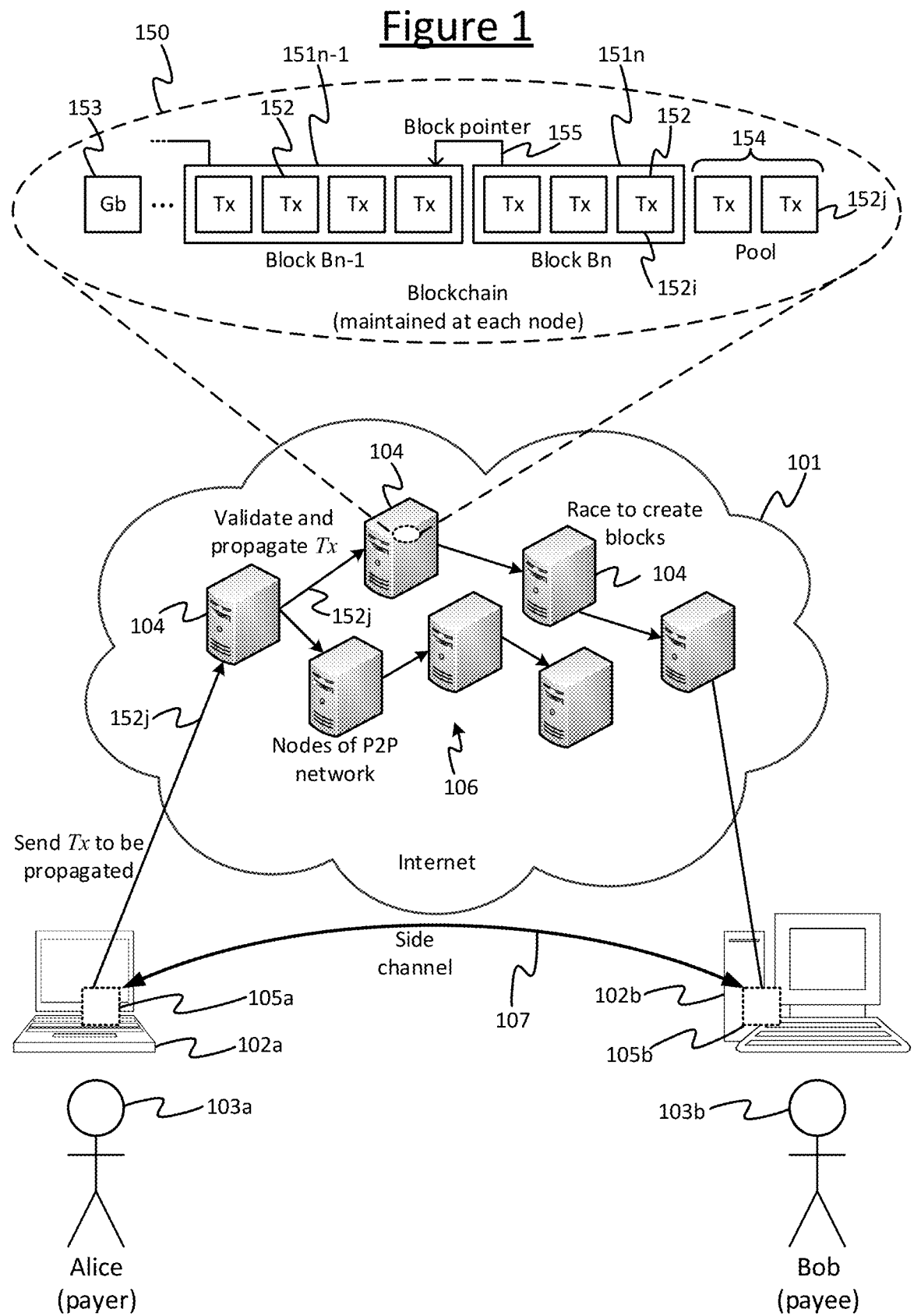
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e.

computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152$j$ according to the blockchain node protocol. Another condition for a transaction to be valid is that the output of the preceding transaction 152$i$ which it attempts to redeem has not already been redeemed by another transaction. Again if not valid, the transaction 152$j$ will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151$n$ pointing back to the previously created block 151$n$-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151$n$ and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151$n$. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151$n$ in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorize (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node 104 applies the same protocol, then assuming the transaction 152j is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
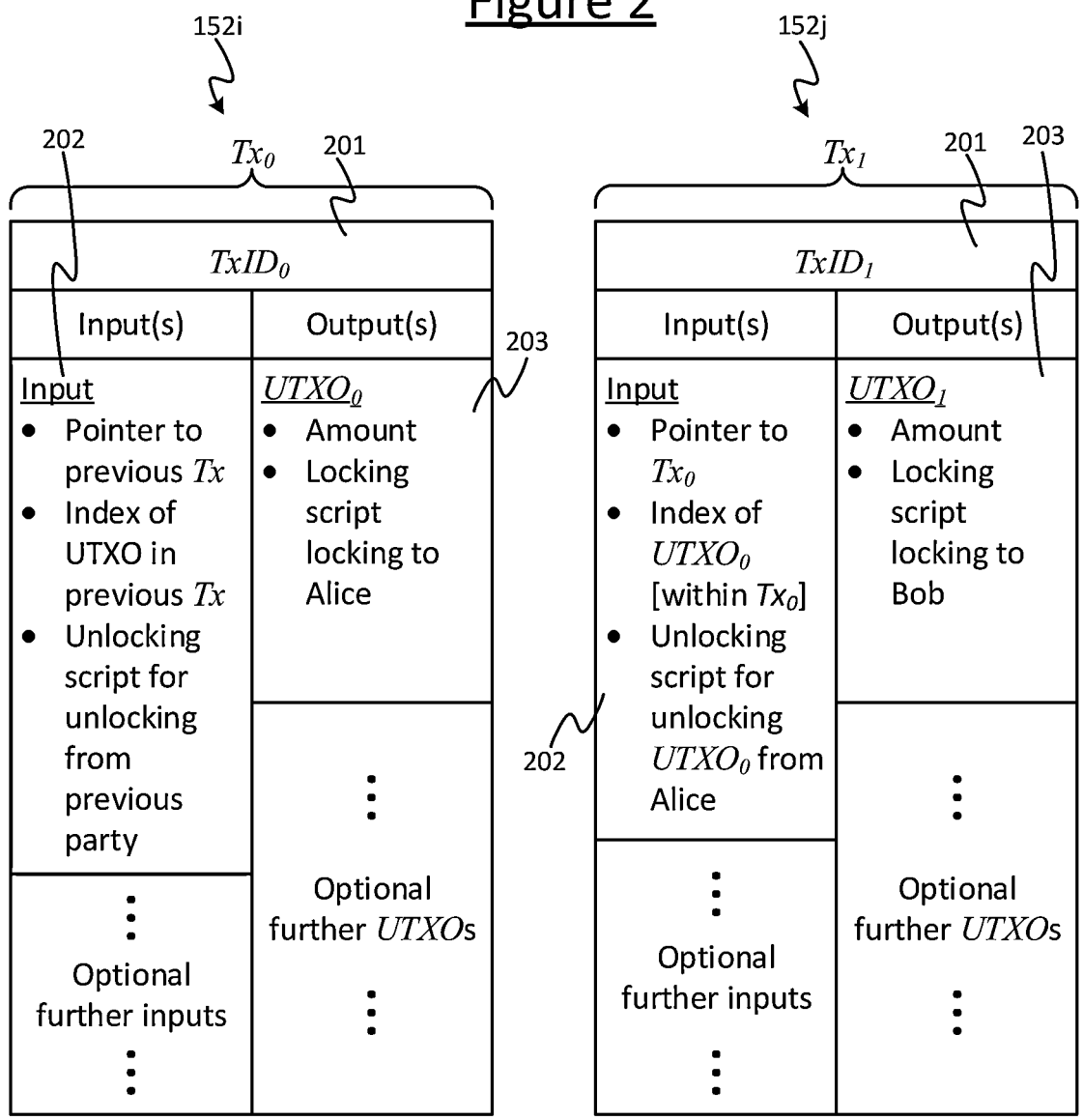
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_2$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$> || [Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The message, m, is derived from specific details of the transaction being signed. Since this message must be identical from signing to verification, this process ensures that the transaction data included in the message cannot be modified without invalidating the signature.

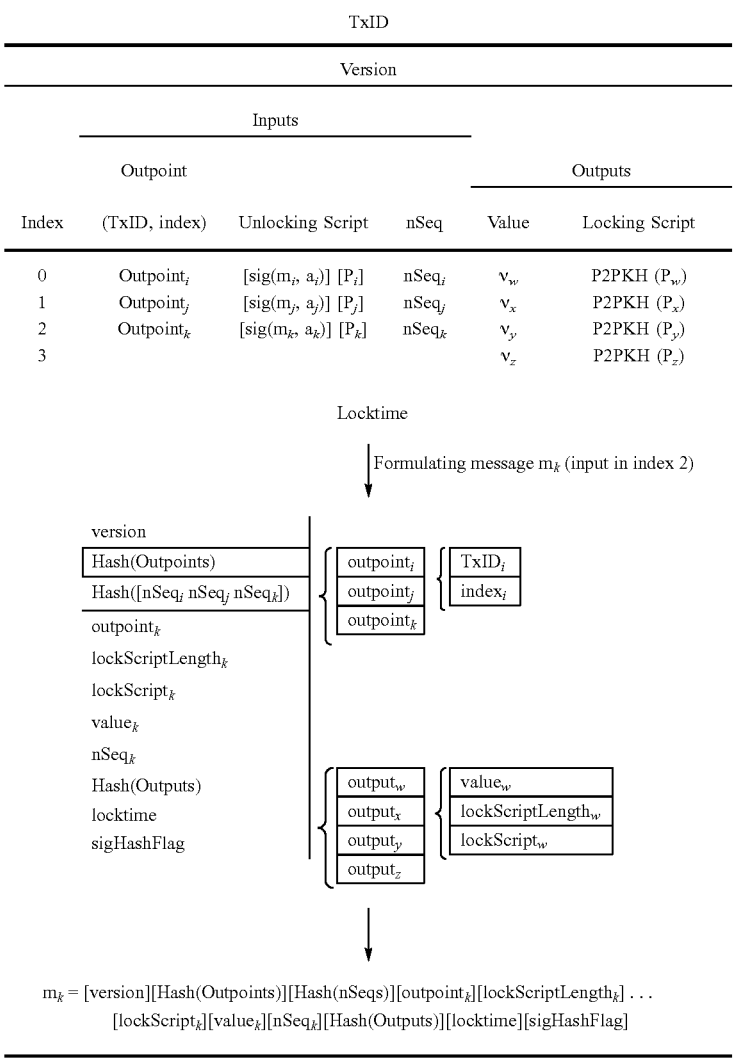

The message is generated by concatenating certain elements of the transaction information in a set order, as shown above. During verification of the signature, the message is not sent explicitly, but is instead recreated by the verifier based on the data in the broadcast transaction; the transaction information is concatenated via the same process used in signing, and double hashed to produce the message digest, e. If any part of the transaction that was used to recreate the message has been changed since the signature was produced, the message will not be identical, and verification will fail.

This process of using transaction details in the signature message provides an important element of security during the delay between the broadcast of a transaction and the point when it is published to the blockchain. However, since any element of the transaction that is 'signed' (i.e. included in the signature message) cannot be updated without invalidating the signature, some transaction fields can never be included in the signature message. These fields are the unlocking scripts for each input, which must be updated to include a signature after it is generated, and the transaction ID (TxID), which is the double hash of the full transaction (including signatures in the unlocking scripts). As both fields must contain (or are derived from) the signatures, they cannot be fixed until after the signatures have been produced.

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_2$ and authenticated), then the blockchain node 104 deems $Tx_1$ valid. This means that the blockchain node 104 will add $Tx_2$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_2$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_2$. Hence if Alice does not want to give Bob all of the amount defined in $UTXO_0$, she can use the remainder to give herself change in a second output of $Tx_2$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_2$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The six different flag types allow a signature to selectively endorse, and therefore fix the details of, either all inputs and outputs, or various subsets. The different sets are illustrated below based on a signature that unlocks the input in index 2. The endorsed inputs and outputs are shown in bold.

|   | ALL | | NONE | | SINGLE | |
|---|---|---|---|---|---|---|
| 0 | Input$_i$ | Output$_w$ 0 | Input$_i$ | Output$_w$ 0 | Input$_i$ | Output$_w$ |
| 1 | Input$_j$ | Output$_x$ 1 | Input$_j$ | Output$_x$ 1 | Input$_j$ | Output$_x$ |
| 2 | Input$_k$ | Output$_y$ 2 | Input$_k$ | Output$_y$ 2 | Input$_k$ | Output$_y$ |
| 3 | | Output$_z$ 3 | | Output$_z$ 3 | | Output$_z$ |

|   | ALL \| ACP | | NONE \| ACP | | SINGLE \| ACP | |
|---|---|---|---|---|---|---|
| 0 | Input$_i$ | Output$_w$ 0 | Input$_i$ | Output$_w$ 0 | Input$_i$ | Output$_w$ |
| 1 | Input$_j$ | Output$_x$ 1 | Input$_j$ | Output$_x$ 1 | Input$_j$ | Output$_x$ |
| 2 | Input$_k$ | Output$_y$ 2 | Input$_k$ | Output$_y$ 2 | Input$_k$ | Output$_y$ |
| 3 | | Output$_z$ 3 | | Output$_z$ 3 | | Output$_z$ |

The flag names, shown at the top of each table, indicate which outputs—ALL, NONE or SINGLE—are included in the message. There are two variants of each flag and these signal which inputs are included in the signature message: the 'standard' variants (ALL, NONE, SINGLE; top row of tables in FIG. 2) include all inputs, while the 'anyone can pay' or ACP variants (ALL|ACP, NONE|ACP, SINGLE|ACP; bottom row) only include the input which the signature unlocks. For the single flag variants (SINGLE or SINGLE IACP) note that the single output that is signed is always the one in the matching index position to the input being unlocked.

The fields in the message that are affected by the choice of sighash flag are Hash(Outpoints), Hash(nSeqs), Hash(Outputs) and the sigHashFlag field itself. When calculating the hash fields, inputs and outputs that are not included (based on the sighash flag) are emptied and the remaining data is concatenated in order and hashed. For example, for a sighash ALL|ACP signature, the information for inputs in index 0 (Outpoint$_i$) and index 1 (Outpoint$_j$) are removed, but the details of all outputs are retained, resulting in the following hash fields:

Hash(Outpoints)=Hash([TxID$_k$][index$_k$])
Hash(nSeqs)=Hash([nSeq$_k$])
Hash(Outputs)=Hash([value$_w$][lockScriptLength$_w$][lockScript$_w$][value$_x$] . . . [lockScriptLength$_x$][lockScript$_x$][value$_y$][lockScriptLength$_y$] . . . [lockScript$_y$][value$_z$][lockScriptLength$_z$][lockScript$_z$])

For a sighash SINGLE signature, all inputs are retained while only one output—that in index 2 matching the position of the signature—is kept, giving:

Hash(Outpoints)=Hash([TxID$_i$][index$_i$][TxID$_j$][index$_j$][TxID$_k$][index$_k$])
Hash(nSeqs)=Hash([nSeq$_i$][nSeq$_j$][nSeq$_k$])
Hash(Outputs)=Hash([value$_y$][lockScriptLength$_y$][lockScript$_y$])

Other fields in the message string are not impacted by the sighash flag. The version and locktime fields (which are always included in the signature message) are identical for all signatures based upon the same transaction, regardless of which input the signature authorizes. The remaining fields (outpoint$_k$, lockScriptLength$_k$, lockScript$_k$, value$_k$, and nSeq$_k$), relate directly to the input being signed, and so will change depending on which input the signature is created to unlock, but are not affected by the choice of sighash flag, since the input which is being unlocked must always be signed.

The signature message, along with the matching private key are passed to the ECDSA signature algorithm to produce a signature, (r,s). In order to include this signature in the blockchain transaction, it must be converted to a single string which is placed in the unlocking script field of the input it authorizes. The string is created by concatenating the two elements of the signature, r and s, and encoding into byte format using the DER standard.

In the message, the sighash flag is appended as a final byte, with each sighash flag being represented by a specific value, as shown in the bale below, to give the serialised signature: sig(a,m)=[r][s][sigHashFlag]. Note that for an outpoint with a pay to public key hash (P2PKH) locking script, the signature is further appended with its associated public key before it is placed in the unlocking script field. During verification, for each signature in the transaction a message is recreated based on the transaction information and the sighash flag, and the signature is checked for validity with that message.

| Flag Name | Byte Value | Byte Value with Fork ID |
|---|---|---|
| ALL | 0x01 | 0x41 |
| NONE | 0x02 | 0x42 |
| SINGLE | 0x03 | 0x43 |
| ALL\|ACP | 0x81 | 0xC1 |
| NONE\|ACP | 0x82 | 0xC2 |
| SINGLE\|ACP | 0x83 | 0xC3 |

The six sighash flags offer the flexibility to 'sign' (by including in the signature message) anything from just one input (NONE|ACP) to all inputs and outputs (ALL). For flags other than sighash ALL, this means that the transaction information that is excluded from the signature message can be changed without invalidating the signature. This allows more flexibility than the standard approach using sighash ALL. For instance, the anyone can pay flag variants do not place any restriction in the details of inputs other than the one which is being signed, which allows other parties to add inputs (i.e. 'pay') into the transaction without invalidating each other's signatures.

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Side Channel

As shown in FIG. 1, the client application on each of Alice and Bob's computer equipment 102*a*, 120*b*, respectively, may comprise additional communication functionality. This additional functionality enables Alice 103*a* to establish a separate side channel 107 with Bob 103*b* (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 107 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

Client Software

Figure 3A:
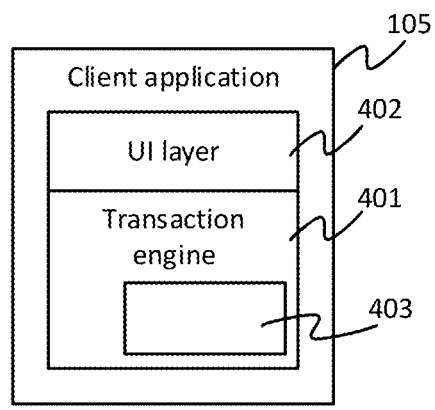
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly. In accordance with embodiments disclosed herein, the transaction engine 401 of each client 105 comprises a function 403 which is configured to perform one or more of the following:

Generate tokens by generating a token issuing transaction;
Initiate a vote by defining voting options, assigning public key(s) to the vote, and transmitting the voting options and public key(s) to voters;
Generating an input-output pair corresponding to a vote of one of the voters and transmitting the input-output pair to a vote coordinator;
Generating a voting transaction comprising received input-output pairs; and
Determine if vote conditions have been satisfied.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
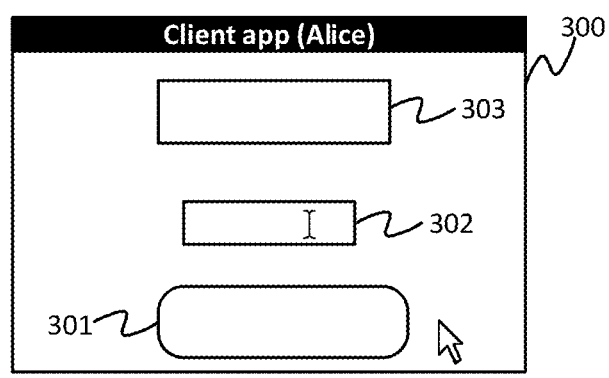
FIG. 3B is a schematic mock-up of an example user interface that may be presented by the client application of FIG. 3A.

FIG. 3B gives a mock-up of an example of the user interface (UI) 300 which may be rendered by the UI layer 402 of the client application 105a on Alice's equipment 102a. It will be appreciated that a similar UI may be rendered by the client 105b on Bob's equipment 102b, or that of any other party.

By way of illustration FIG. 3B shows the UI 300 from Alice's perspective. The UI 300 may comprise one or more UI elements 301, 302, 303 rendered as distinct UI elements via the user output means.

For example, the UI elements may comprise one or more user-selectable elements 301 which may be, such as different on-screen buttons, or different options in a menu, or such like. The user input means is arranged to enable the user 103 (in this case Alice 103a) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to select one of a predefined set of voting options which have been provided in voting instructions to cast a vote, select one or more suggested voting options when defining voting options, select the received input-output pairs to be included in a complete voting transaction, or select a group of users from a user directory for whom to generate tokens.

Alternatively or additionally, the UI elements may comprise one or more data entry fields 302, through which the user can enter text to define data to be included in an OP_RETURN or voting options to be included in the voting instructions. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 303 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 300 shown in FIG. 3 is only a schematized mock-up and in practice it may comprise one or more further UI elements, which for conciseness are not illustrated.

Node Software

Figure 4:
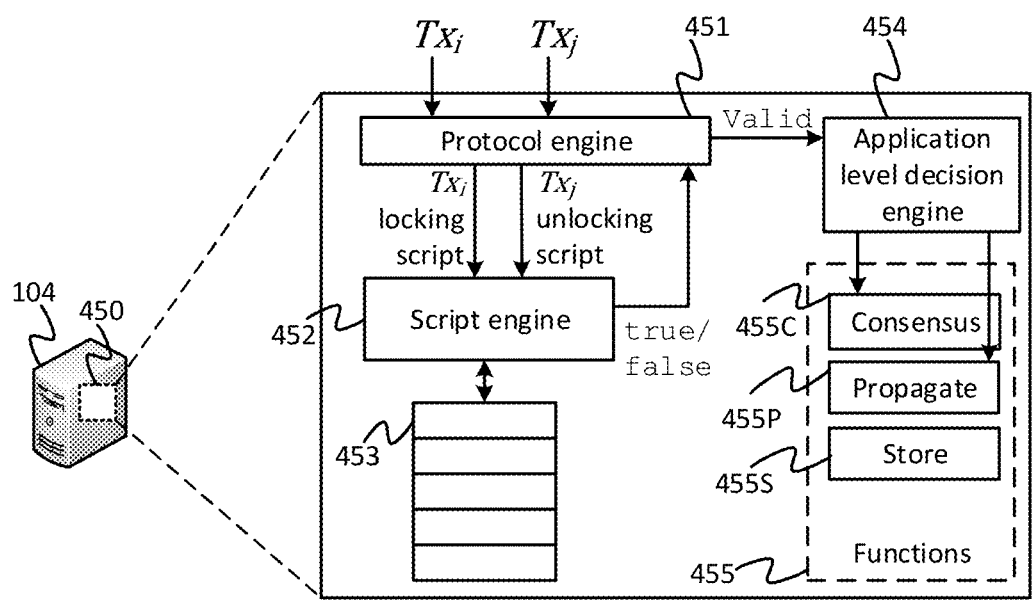
FIG. 4 is a schematic block diagram of some node software for processing transactions.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152$j$ (Tx$_j$) is received having an input pointing to an output (e.g. UTXO) of another, preceding transaction 152$i$ (Tx$_{m-1}$), then the protocol engine 451 identifies the unlocking script in Tx$_j$ and passes it to the script engine 452. The protocol engine 451 also identifies and retrieves Tx$_i$ based on the pointer in the input of Tx$_j$. Tx$_i$ may be published on the blockchain 150, in which case the protocol engine may retrieve Tx$_i$ from a copy of a block 151 of the blockchain 150 stored at the node 104. Alternatively, Tx$_i$ may yet to have been published on the blockchain 150. In that case, the protocol engine 451 may retrieve Tx$_i$ from the ordered set 154 of unpublished transactions maintained by the node 104. Either way, the script engine 451 identifies the locking script in the referenced output of Tx$_i$ and passes this to the script engine 452.

The script engine 452 thus has the locking script of Tx$_i$ and the unlocking script from the corresponding input of Tx$_j$. For example, transactions labelled Tx$_0$ and Tx$_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of Tx$_j$ does not exceed the total amount pointed to by its inputs, and that the pointed-to output of Tx$_i$ has not already been spent by another valid transaction. The protocol engine 451 evaluates the result from the script engine 452 together with the one or more protocol-level conditions, and only if they are all true does it validate the transaction Tx$_j$. The protocol engine 451 outputs an indication of whether the transaction is valid to the application-level decision engine 454. Only on condition that Tx$_j$ is indeed validated, the decision engine 454 may select to control both of the consensus module 455C and the propagation module 455P to perform their respective blockchain-related function in respect of Tx$_j$. This comprises the consensus module 455C adding Tx$_j$ to the node's respective ordered set of transactions 154 for incorporating in a block 151, and the propagation module 455P forwarding Tx$_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Tokens

Some transactions comprise inputs associated with different users, such as the voting transactions described below. To restrict who can contribute to a transaction, tokens are issued to permitted contributors, which allow the permitted contributors to provide inputs and outputs in the transaction.

Tokens will be described with reference to use in a vote.

An example token issuing transaction is shown below and in FIG. 5. The transaction is generated by a device of a party responsible for the transaction to be generated using the tokens. In the case of a vote, the party is the vote coordinator.

| Tx$_{tokenissue}$ | | | |
|---|---|---|---|
| Inputs | | Outputs | |
| Outpoint$_0$ | <Sig$_{Coord}$: ALL> | x BSV | <signing condition> <P2PKH P$_{V1}$> |
| | | x BSV | <signing condition> <P2PKH P$_{V2}$> |
| | | ... | ... |
| | | x BSV | <signing condition> <P2PKH P$_{Vn}$> |
| | | y BSV | <P2PKH P$_{Coord}$> |

The token issuing transaction 500 has a single input comprising an outpoint 504 identifying the transaction ID and index of an unspent transaction output and an unlocking script 506 comprising a signature of the vote coordinator with a sighash ALL flag, such that all of the inputs and outputs of the token issuing transaction 500 are signed by the vote coordinator's signature.

The token issuing transaction 500 has multiple outputs. There is a set of tokens 510, one for each of the eligible voters, and an output associated with the coordinator. The output associated with the vote coordinator comprises an unspent transaction output and a locking script locking the UTXO to a public key of the coordinator.

In FIG. 5, there are 3 tokens, each with a corresponding locking scrip 508 identifying an eligible voter to whom the token is locked. The token is an unspent transaction output which has a low or nominal value, such that it may be considered a dust UTXO. This means that, if the voter does not cast their vote, only small amount of digital asset is lost by the vote coordinator, and there is little incentive for the voter not to vote. The locking script also comprises a signing condition which defines a sighash flag which must be used when the voter uses the token to vote. In the case of a quorum vote, where only a portion of voters need to cast votes and so the inputs cannot be known prior to vote casting, the signing condition defines that a SINGLE|ACP sighash flag must be used. On the other hand, if all voters must vote, such that all inputs are known prior to vote casting, the signing condition can define either single sighash flag, that is either SINGLE|ACP or SINGLE is defined in the signing condition.

When the token is used, the signing condition checks whether the last byte of the signature, which indicates the sighash flag used to sign, is equal to a specific value associated with the defined signing condition. For example, to check that sighash SINGLE|ACP (byte value 0x83) is used, the following series of OP codes could be included at the beginning of the locking script:

OP_TOALTSTACK OP_DUP OP_1 OP_SPLIT OP_SWAP OP_2 OP_MINUS OP_SPLIT OP_NIP <0x83> OP_EQUALVERIFY OP_FROMALTSTACK

An explanation of this code can be found in appendix A. It will be appreciated that the code given is only an example SCRIPT code and the skilled person would know of other SCRIPT codes which may be used to achieve the same result.

An eligible voter can subsequently use their token in a voting transaction by providing an outpoint identifying the token issuing transaction and the UTXO locked to the voter, a signature of the voter to whom the token is locked, and the sighash flag indicated in the locking script of the token.

Tokens as described above can be used for other transactions in which multiple parties contribute to the same transaction. The tokens provide a way of limiting the parties that can contribute to the transaction and provides a way of easily identifying a contribution from an unauthorized party.

Voting Method

In a vote, multiple parties contribute to a single transaction.

When signatures are applied using sighash ALL, the entire transaction including details of all inputs and outputs must be defined before signing begins, as once a signature with an ALL flag has been applied, there can be no further editing of inputs or outputs. This means that all parties must collaborate first to define the transaction, and then a second time to sign it. In contrast, using different sighash flags can provide a level of autonomy between the parties by allowing them to independently set different outputs and apply signatures, without the need to predefine all transaction details.

Since parties cast votes at different times, and it is preferable that the voting option chosen by each party is kept anonymous, parties sign their input with a single sighash flag such that only the output provided by the party is included in the signing message. To prevent any voter from removing the vote of another voter from the transaction without the knowledge of the other voter, the transaction is generated by a vote coordinator, who compiles the voting transaction and authorizes the voting transaction with an ALL sighash flag once all votes have been received and included.

The ACP flag variants lend themselves towards use in situations where multiple inputs are present, since they allow the inputs to be defined independently. Similarly, SINGLE flag variants allow for a specific output to be signed without fixing other outputs. These two features mean that the SINGLE IACP flag can be used to sign an input-output pair which inhabit matching index positions, without placing any restrictions on the details or number of other inputs and outputs. This gives considerable freedom for the pairs to be combined into a single transaction: since all inputs and outputs are signed, the only requirement for the full transaction to be valid is that the combined value of the inputs must be sufficient to cover all the assigned outputs plus the appropriate transaction fee. For example, transactions Tx and Tx' illustrated below, which are formed from a set of four independently signed pairs, will both be valid if the input values exceed the output values.

| Inputs | | Outputs |
| --- | --- | --- |
| | Tx | |
| Alice's Input | <$Sig_A$: SINGLE|ACP> $x_0$ BSV | Alice's Output |
| Bob's Input | <$Sig_B$: SINGLE|ACP> $x_1$ BSV | Bob's Output |
| Charlie's Input | <$Sig_C$: SINGLE|ACP> $x_2$ BSV | Charlie's Output |
| Delilah's Input | <$Sig_D$: SINGLE|ACP> $x_3$ BSV | Delilah's Output |
| | Tx' | |
| Charlie's Input | <$Sig_C$: SINGLE|ACP> $x_2$ BSV | Charlie's Output |
| Bob's Input | <$Sig_B$: SINGLE|ACP> $x_1$ BSV | Bob's Output |
| Delilah's Input | <$Sig_D$: SINGLE|ACP> $x_3$ BSV | Delilah's Output |

However, while sighash SINGLE IACP allows a great deal of flexibility, it also leaves a potential for malleability. Any input-output pair that is signed using SINGLE IACP can be copied and included in a competing transaction without invalidating the original signature. If an interceptor broadcasts an altered transaction to the network, it is not certain which version of the transaction will be published to the blockchain, as some nodes on the network may receive the altered version before the original. This is particularly problematic if the value of the input in the signed pair is larger than the output: any excess value can be assigned to the interceptor's address in the altered transaction. Thus, to disincentivise interference, SINGLE|ACP-signed pairs should not leave any input value unassigned.

Defining a Vote

The vote coordinator defines the vote.

There are a predefined set of options for the vote, and the voters must select one of the predefined options. An example of this is an election vote, in which voters select one of the candidates who are running for election. The vote can include an "other" option, which may allow users to input their own answer.

The vote coordinator defines the set of options, for example the candidate list. A different public key can be assigned to each of the options by the vote coordinator. These assignments are stored in a database. The public key can be used to generate an address. When a voter selects one of the predefined voting options, the unspent transaction output is locked to the public key associated with the selected option.

Voters may be able to provide other user defined inputs. For example, a voter can select a voting option and provide further comments for including in the vote results by typing the comments in a data entry field.

The vote coordinator defines that a voter is permitted to input text. When a voter participates in the vote, the unspent transaction output of the vote is locked to the public key of the selected voting option, and the text is rendered in the OP_RETURN of the transaction.

Full Group Votes

Consider a group who wish to enact a confidential vote where every member of the group must vote. Voting options should be pre-defined by the vote coordinator as set out above, and voters should not be able to see each other's choices until all votes have been cast. Individual votes could be represented within a transaction by the details of a single output (for instance by associating all vote choices with a particular output address) provided that the outputs can be set and signed independently by a single voting party. To allow this, the voting transaction should contain an input from each voter, and a matched output that is signed using a single sighash flag. The inputs can be voting tokens of nominal value that are issued to each member of the group in advance of the vote.

For example, for a group of three voters (Alice, Bob and Charlie) and a coordinator (Delilah), a vote could be carried out as follows:

1. Delilah makes a transaction that creates three dust UTXOs that will act as voting tokens, assigning one each to Alice, Bob and Charlie.

| Tx₀ (VALID) | | | |
|---|---|---|---|
| Inputs | | Outputs | |
| Outpoint₀ | <Sig_D: ALL> | dust BSV | Alice's Address |
| | | dust BSV | Bob's Address |
| | | dust BSV | Charlie's Address |
| | | x BSV | Delilah's Change Address |

2. Delilah adds these token UTXOs as inputs to the voting transaction template, along with an additional input, which she controls, that contains sufficient funds to cover the transaction fee. She sends this template to Alice, Bob and Charlie, along with the list of output addresses that correspond to each choice in the vote.

| Tx₁ (NOT VALID) | |
|---|---|
| Inputs | Outputs |
| Outpoint_A | |
| Outpoint_B | |
| Outpoint_C | |
| Outpoint_D | |

3. Alice, Bob and Charlie each set their nominated output details to reflect their vote choice and create a signature using sighash SINGLE that is placed in the unlocking script of their input. Signing SINGLE does not place any restrictions on the outputs that are set in other indexes, so they do not need to know the voting choice of the other parties to produce a valid signature. All voting parties should return their partially-signed transaction (which represents their vote) to Delilah. For example, Bob's vote might take the following form:

| Tx_Bob (NOT VALID) | | | |
|---|---|---|---|
| Inputs | | Outputs | |
| Outpoint_A | | | |
| Outpoint_B | <Sig_B: SINGLE> | dust BSV | Address representing Option 1 |
| Outpoint_C | | | |
| Outpoint_D | | | |

4. Once Delilah has received all the votes, she combines them into a single voting transaction, creates a signature to validate the spend of her input using sighash ALL, and broadcasts the transaction, providing an immutable record of the vote.

| Tx₂ (VALID) | | | |
|---|---|---|---|
| Inputs | | Outputs | |
| Outpoint_A | <Sig_A: SINGLE> | dust BSV | Address representing Option 2 |
| Outpoint_B | <Sig_B: SINGLE> | dust BSV | Address representing Option 1 |
| Outpoint_C | <Sig_C: SINGLE> | dust BSV | Address representing Option 1 |
| Outpoint_D | <Sig_D: ALL> | x BSV | Delilah's Change Address |

Though Delilah is required to set up the voting template and collate the votes, she does not have any opportunity to interfere with the results. By pre-defining the inputs before any party signs, the group ensure that all parties must provide a vote in order to produce a valid transaction. Similarly, because the inputs can only be validated by the parties who hold the pre-designated keys, no vote can be falsified by another party (including Delilah).

FIG. 6 is an example of a voting transactions 600 for a full group vote, wherein the vote tokens are issued using the token issuing transaction of FIG. 5. The voting transaction 600 comprises four inputs and four outputs.

In a $0^{th}$ index, there is a first input-output pair provided by a first voter. The input comprises a non-signature portion and a signature portion. The non-signature portion comprises an outpoint indicating the token at index 0 of the token issuing transaction in FIG. 5 and the signature portion comprises a signature of the first voter, to whose public key the token is locked, and a SINGLE sighash flag. The output comprises a digital asset value equal to the value of the token and a locking script comprising the address of the voting option the user has selected—voting option 1. The signature signs all of the inputs of the voting transaction 600 as well as the output at the $0^{th}$ index of the voting transaction 600, but no other outputs of the voting transaction 600. That is, the signature message includes the four inputs and only the output in the $0^{th}$ index.

Similar input-output pairs are provided in the $1^{st}$ and $2^{nd}$ indexes respectively, with the input-output pair in the $1^{st}$ index indicating the token in at index 1 of the token issuing transaction with a signature of the second voter and a SINGLE sighash flag, an unspent transaction output value equal to that of the token and the address of voting option 3 as selected by the second voter, and with the input-output pair in the $2^{nd}$ index indicating the token in at index 2 of the token issuing transaction with a signature of the third voter and a SINGLE sighash flag, an unspent transaction output value equal to that of the token and the address of voting option 1 as selected by the third voter.

The input at index 3 comprises an outpoint indicating a UTXO of the vote coordinator and the signature of the vote coordinator with an ALL sighash flag. The output at index 3 comprises a UTXO with a value equal to that of the UTXO indicated in the input less the transaction fee (since the full value of each token is locked to the public key of the voting option) and a locking script comprising the public key of the vote coordinator. If the UTXO value of the outputs of the votes in indexes 0 to 2 is less than that indicted in the inputs, such that each vote contributes to the transaction fee, the difference between the UTXO referenced in the input of index 3 and the UTXO of the output of index 3 need only be equal to the amount of the transaction fee not covered by the individual votes.

The indexes at which the input-output pairs provided by the voters may be referred to as vote indexes. In the example of FIG. 6, these are indexes 0, 1, and 2. In index at which the vote coordinator provides their signature, here index 3, may be referred to as an authorising index because the vote coordinator signs all of the input and output. It will be appreciated that the vote and authorising indexes may be provided at any index in the transaction 600, so long as the vote coordinator only sings the inputs and outputs after all of the vote indexes have been provided.

The voting transaction 600 also comprises a transaction ID, and in-count of 4 and an outcount of 4.

Figure 8:
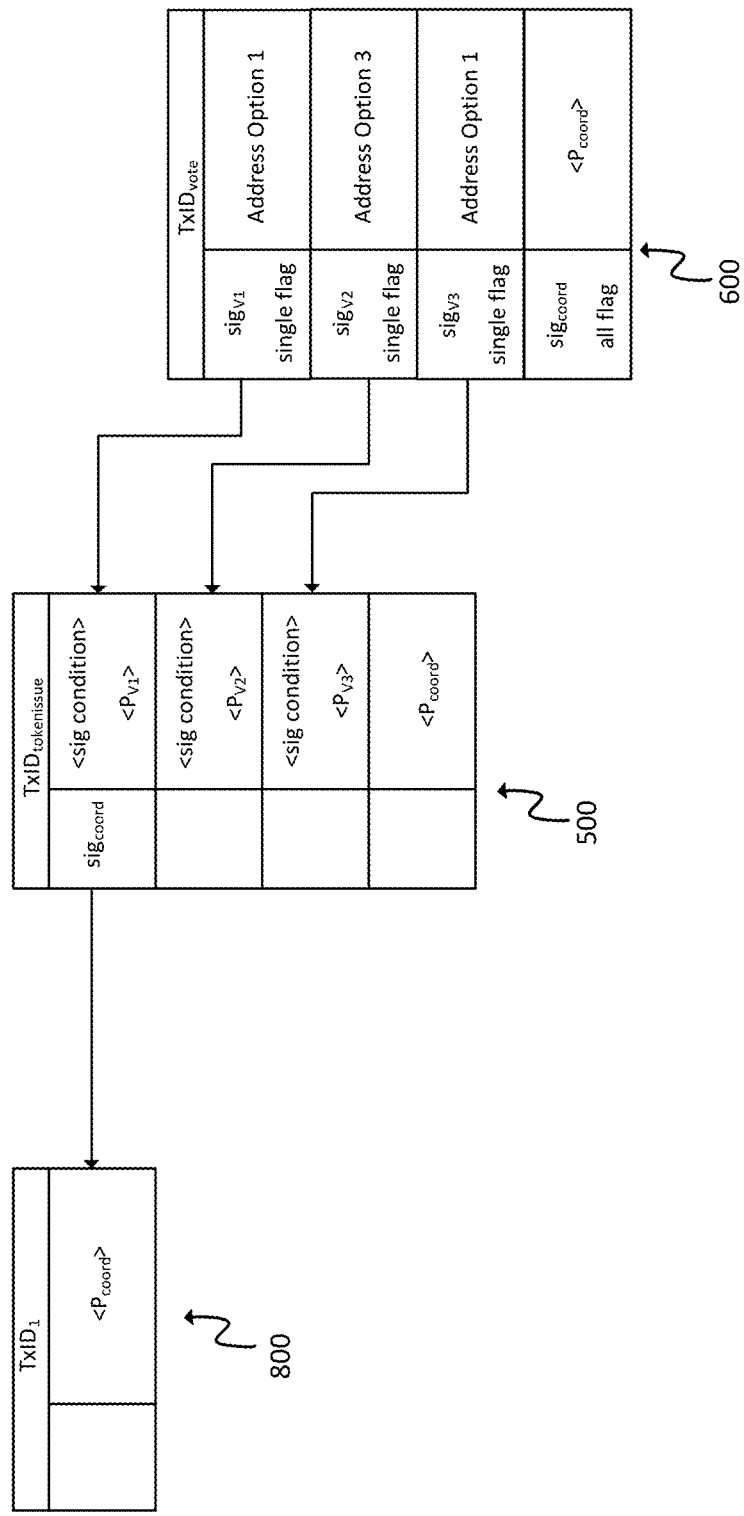
FIG. 8 is a schematic diagram of the relationships between the inputs and outputs of a token issuing transaction and a voting transaction.

FIG. 8 shows the relationship between the voting transaction 600 and the token issuing transaction 500. Each input of the voting transaction 600 corresponding to a vote (at indexes 0 to 2) indicates an output of the token issuing transaction 500 as discussed above. When the voting transaction 600 is validated by a blockchain node, the locking and unlocking scripts associated with the same UTXO are run together to check that the unlocking script meets the requirements of the locking script. This includes checking the sighash flag value if the locking script of the token includes such a signing condition.

The input of the token issuing transaction 500 is shown to point to an output of a previous blockchain transaction 800 which locks a UTXO to the public key of the vote coordinator. The previous transaction may comprise inputs for spending the UTXOs associated with a previous vote (not shown) such that the digital assets used for a previous vote are reused.

In the full group vote, either SINGLE or SINGLE IACP sighash flags can be used. If tokens are used, as shown above and in FIG. 6, the inputs are known to the vote coordinator prior to generation of the voting transaction so the voters can use the SINGLE sighash flag. The users can also use a SINGLE IACP sighash flag in this scenario without affecting the ability of any other voters to cast votes.

Alternatively, no tokens are issued, such that step 1 above is excluded, and the voters vote by spending an unspent transaction output of a predefined value which has previously been assigned to the voter. That is, a "cost" of the vote has not been provided to the voter by the vote coordinator, but rather the voter must pay to vote. The cost of the vote in this case may be nominal to promote voting. The outpoints which are to be provided by the voters when casting votes are not known to the vote coordinator prior to voting, and so the SINGLE IACP sighash flag is used by the voters.

The tokens above have a "dust" UTXO value, which is a small value. Such a small value may be created when there is a very small amount left over as change from a transaction, for example. These dust UTXOs may not contain sufficient value to cover a transaction fee, rendering them non-functional in isolation. If the token is not used, the vote coordinator only loses a small amount.

Quorum Votes

In some cases, not all parties may be required to return a response, and instead would agree that a vote is valid as long as a threshold number of members (a quorum) within the group have participated. In this case, since the exact inputs cannot be pre-defined (as which of the eligible voters will return a vote is unknown), voting tokens should be signed using the SINGLE IACP flag.

1. A coordinator should issue voting tokens to all eligible voters. These should have an additional spending requirement (defined in the locking script) so that they must be signed using a SINGLE|ACP flag.

| $Tx_0$ (VALID) | | | |
|---|---|---|---|
| Inputs | | Outputs | |
| $Outpoint_0$ | $<Sig_D: ALL>$ | x BSV | $<signing\ condition> <P2PKH\ P_{V1}>$ |
| | | x BSV | $<signing\ condition> <P2PKH\ P_{V2}>$ |
| | | ... | ... |
| | | x BSV | $<signing\ condition> <P2PKH\ P_{Vn}>$ |
| | | y BSV | $<P2PKH\ P_{Coord}>$ |

This signing condition is an extra condition in the locking script that checks whether the last byte of the signature (which indicates the sighash flag used to sign) is equal to a specific value. For example, to check that sighash SINGLE|ACP (byte value 0x83) was used, the following series of OP codes could be included at the beginning of the locking script:

OP_TOALTSTACK OP_DUP OP_1 OP_SPLIT OP_SWAP OP_2 OP_MINUS OP_SPLIT OP_NIP <0x83> OP_EQUALVERIFY OP_FROMALTSTACK

An explanation of this script can be found in Appendix A.

2. Any eligible voter who chooses to vote should return a signed voting token to the coordinator by the vote deadline. If desired, voters could set the locktime so that the votes would not be valid before a deadline of the vote.

| $Tx_{V2}$ | | | |
|---|---|---|---|
| Inputs | | Outputs | |
| $Tx_0$, index 1 | $<Sig_{V2}: SINGLE|ACP>$ | x BSV | Address representing Option 1 |

3. Once the vote deadline has passed, the coordinator collects all submitted votes into a single transaction. They should check that all tokens used were valid for this vote and that the required quorum has been achieved. This can be done manually or via a smart contract, e.g. one that checks that all voting inputs reference $Tx_0$ and that the total value of the token inputs is above the required value ($n_Q$x BSV, where $n_Q$ is the number of votes required for a quorum). If these conditions are met, the coordinator adds a final input and output to cover transaction fees, signs using sighash ALL, and broadcasts the final vote transaction

| $Tx_1$ (VALID) | | | |
|---|---|---|---|
| Inputs | | Outputs | |
| $Tx_0$, index 0 | $<Sig_{V1}: SINGLE|ACP>$ | x BSV | Address representing Option 1 |
| $Tx_0$, index 1 | $<Sig_{V2}: SINGLE|ACP>$ | x BSV | Address representing Option 3 |
| ... | ... | ... | ... |
| $Tx_0$, index n | $<Sig_{Vn}: SINGLE|ACP>$ | x BSV | Address representing Option 3 |
| Outpoint | $<Sig_{Coord}: ALL>$ | z BSV | $<P2PKH\ P_{Coord}>$ |

Note that if the coordinator makes a mistake and does not include votes that were eligible, they can simply create a second transaction containing the missed votes. Similarly, if for some reason the SINGLE IACP votes are included in a separate transaction and mined before the main voting transaction, the coordinator can add a reference to the TxID where the votes were included in the OP_RETURN of the final output.

FIG. 7 shows an example of a voting transaction 700 for a quorum vote, using the tokens issued in FIG. 5. The voting transaction 700 is similar to the voting transaction 600 for the full vote, however only two voters have cast a vote. The second voter has not voted, and so only the input-output pairs of the first and third voters are included in the voting transaction 700 at indexes 0 and 1 respectively, although the votes may be provided in any order and at any index. Index 2 comprising the input and output associated with the vote coordinator, as in the $3^{rd}$ index of the voting transaction 600 of FIG. 6. The in-count and out-count of the voting transaction 700 are therefore both 3.

As with full group votes, tokens may not be issued in some embodiments. Instead, voters provide an outpoint indicating an unspent transaction output which has the predefined value to cover the cost of the vote. In some instances, this cost may be minimal to promote voting. In other instances, the cost may not be insignificant, to deter voters from participating who have little interest in the vote, or from voting multiple times to skew the vote results.

A specific example of a quorum vote is an opinion poll. In this example, it would not be possible to define the voting parties in advance, and so inputs would need to be signed using the SINGLE IACP flag. An opinion poll setup could work as follows:
1. Alice, the poll originator, posts publicly with the details of two or more poll choices. Each poll choice should be associated with an address that Alice can unlock.
2. Any person who would like to register a vote in the poll can create a SINGLE IACP-signed input-output pair with the following properties:
   The output should be one of the poll choice addresses defined by Alice;
   The input should have a minimum value to discourage spam voting;
   The value of the output should match the input;
   The locktime should be set to match the deadline for the poll.
3. Each 'vote' pair is sent directly to Alice, who combines them into a single transaction. She adds a final input to fund the transaction fee if necessary and signs sighash ALL.
4. Once the transaction has been validated by a blockchain node and published to the blockchain, it provides a record of the poll results. Alice benefits from the value that each respondent contributed via their input, regardless of which poll option was chosen.

The malleability of the SINGLE IACP flag, in contrast to the SINGLE flag, means that when Alice broadcasts the final transaction, it would be possible for someone to intercept it before it reaches the network and create an alternative transaction based on a subset of the eligible votes that would still be valid. However, the interceptor would not be able to redirect any of the value contributed by poll respondents, since the output addresses are fixed and the values are matched with the input value, so the only potential effect would be to change the outcome of the poll. In this situation it would still be possible for Alice to create a second transaction containing the excluded poll responses so that she can collect the value contributed by those inputs. Nonetheless, it might be worthwhile to introduce a service provider who would take a proportion of the value in each poll in return for protecting against this malleability, for example via a contract with block producers (or the service's own block production capabilities) which allows poll transactions to be sent directly to the core network without the need for wider broadcast.

Figure 9:
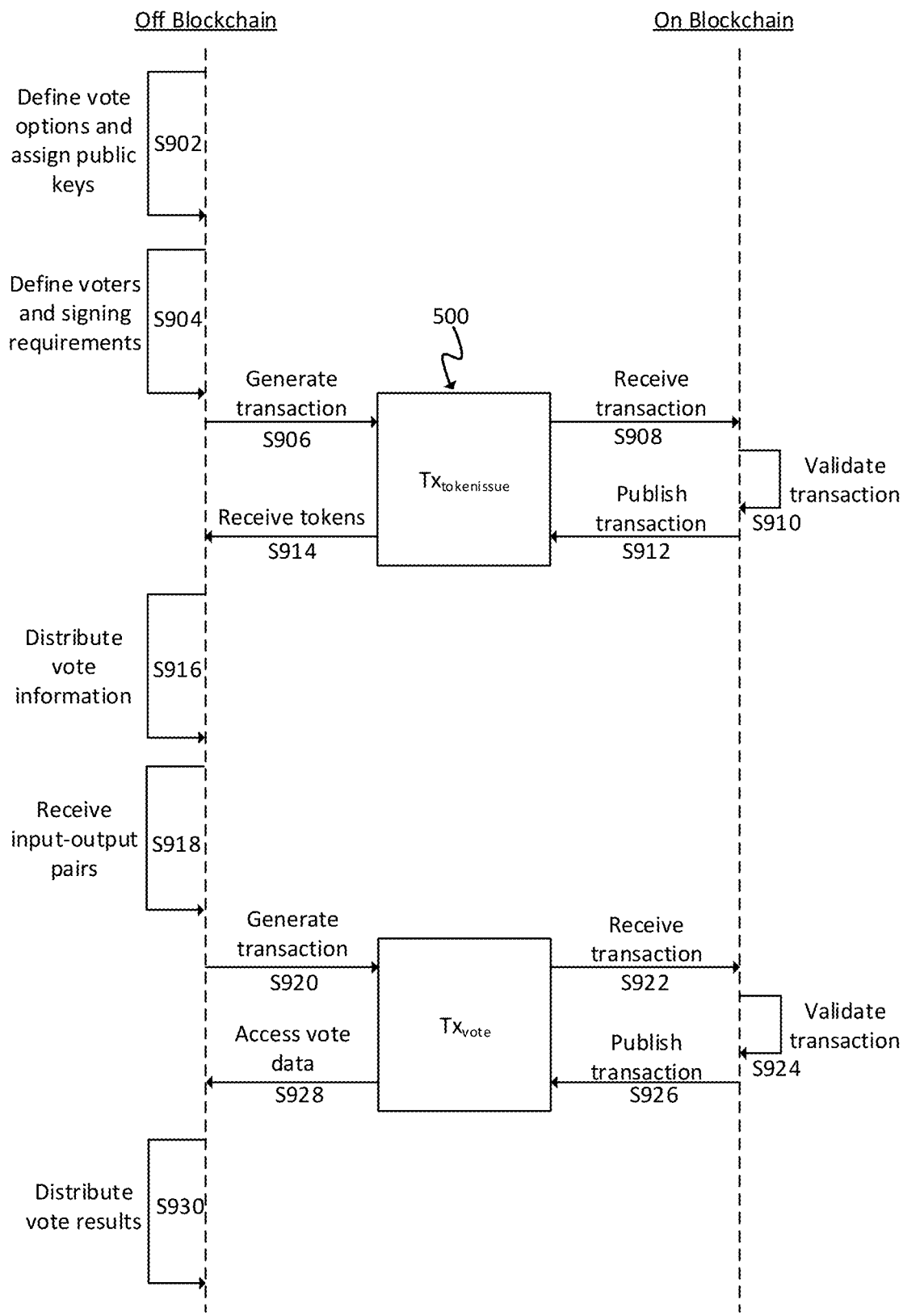
FIG. 9 shows an example method of providing a vote using a blockchain.

FIG. 9 shows an example method of providing a vote using the blockchain. The actions on the left-hand side are actions performed off the blockchain and the actions on the right-hand side are actions performed on the blockchain by blockchain nodes.

At step S902, the vote coordinator defines the voting options and assigns at least one public key to the vote. In the case of a single public key being assigned, the voting option chosen by the voter is returned in the OP_RETURN of the transaction, with all UTXO of the votes being locked to the single public key of the vote. In the case of multiple public keys, one public key is associated with each voting option such that the UTXO of a vote is locked to the public key of the chosen voting option. The association between voting options and public keys is stored. The vote coordinator sets a time by which votes must be received. The vote coordinator defines the voting options via a user device running a computer program which renders a user interface such as those shown in FIGS. 3A and 3B.

The vote coordinator also defines the voters and signing requirements, step S904. The vote coordinator defines who is eligible to vote, and the number of voters required, i.e. whether it is a full group vote or a quorum vote. The signing requirement is at least in part dependent on whether or not the vote is a full group vote. The vote coordinator also defines any vote weighting or other special voting privileges, such as veto votes, at this step.

At step S906, the vote coordinator generates the token issuing transaction 500 based on the voter requirements defined in step S904. The token issuing transaction 500 is received by a blockchain node, step S908, which validates the transaction, step S910, and publishes the transaction to the blockchain, step S912.

Once validated and published, the tokens are locked to the public keys of the voters. The voters are said to receive the tokens, step S914.

At step S916, the vote coordinator distributes the voting options and defined public key(s) to the voters. Other information, such as the cost of a vote, the deadline to vote, and the transaction ID of the token issuing transaction 500 may be included in the distributed vote information.

Each voter who wishes to partake in the vote defines their input-output pair, indicating the voting option they have chosen and providing a signature for spending their voting token with the required sighash flag. These are transmitted to the device of the vote coordinator, which receives the input-output pairs at step S918.

Once the deadline for vote casting has past, or all of the votes have been received, the vote coordinator checks that the required number of participants have submitted input-output pairs, and that the inputs comprise outpoints identifying the tokens issued for the vote. If these vote conditions are satisfied, the vote coordinator generates the voting transaction 600, 700 at step S920 comprising all of the received input-output pairs. If any invalid input-output pairs have been received, for example from parties not eligible to vote or not using a token to vote, the invalid input-output pairs can be ignored and discarded.

The voting transaction 600, 700 is received by a blockchain node, step S922, which validates the transaction at step S924 and publishes the transaction to the blockchain at step S926.

Once published, the vote coordinator can access the vote data, step S928. If each voting option is associated with a different public key, the vote data or result can be determined by accessing the different addresses associated with the public keys. The amount of UTXO at each address, or the amount received at the address as a result of the voting transaction 600, 700, is proportional to the number of votes received by each voting option, including any weighting of votes. This provides an efficient and accurate method of vote counting.

Alternatively, the voting transaction 600, 700 itself can be accessed once stored to the blockchain to access the vote data. This provides a way of viewing the data in the OP_RETURN. Votes cast using OP_RETURN are counted by the vote coordinator or their computer device.

The vote coordinator can then distribute the results of the vote to the voters at step S930.

By publishing the votes to the blockchain as set out above, it is easier to track vote results and vote participants. The votes are also immutable, so the results are more reliable than hand counted votes.

The term "vote coordinator" is used above to reference both a user controlling a user device and a computer program running on the user device configured to implement the method steps on the computer device.

It will be appreciated that some of the method steps of FIG. 9 may be implemented in a different order or simultaneously. For example, step S904, defining the voters, may be the first step, or performed simultaneously to step S902. Step S902, defining the voting options, may not be performed until after the tokens have been received by the voters, step S914. Other alternative orderings of the method steps will be apparent to a person skilled in the art.

FIG. 10 shows an example method of voting by a voter. The method is implemented on a user device of the voting party by running a computer program on the processors of the device. The voting party uses the client application 300 to provide inputs.

At step S1002, voting instructions are received from the vote coordinator. The voting instructions comprise the voting options as defined by the vote coordinator and the public keys associated with the voting options. The voting options are rendered on the display of the user device at step S1004 as user selectable items 301.

The user selects, or otherwise inputs, the voting option they choose. This selection is detected at the UI 300, step S1006.

At step S1008, the public key associated with the selected voting option is determined using the received voting instructions.

The input-output pair for the voter's vote is generated at step S1010. The input comprises an outpoint and a signature of the party with a single sighash flag, and the output comprises the public key associated with the user selected voting option and the required amount of digital asset.

The user device then transmits the input-output pair, as step S1012, to the vote coordinator for including in the vote transaction.

If the vote coordinator also generates voting tokens, the voting instructions include information regarding the tokens, for example the outpoint identifying the token and the value of a vote (in the case that voters can split their tokens to cast multiple votes). The input generated by the user device at step S1010 comprises the outpoint identifying the token, and the output comprises a value proportional to a number of votes the party wishes to assign to the selected voting option.

However, if no tokens are issued, the voting instruction include a cost of a vote, and the input comprises an outpoint identifying a UTXO with a value equal to the cost.

If only a single public key is associated with the vote, the step of determining the public key, step S1008, is removed from the method and the output comprises the single public key associated with the vote.

As discussed above, voters may be able to input user defined comments or voting options in the form of voter provided text via a data entry field 302 of the UI 300. The voter provided text is included in the output, for including in the OP_RETURN of the voting transaction.

Variations

Anonymity: In the setup described here, voters know the identity associated with each voting token, and so parties' voting choices can be identified once the finalised transaction has been broadcast. However, it is not necessary for the coordinator to publicly identify which token was issued to each voter, and provided that tokens are issued to addresses that have not previously been linked publicly to voters, a secret vote could be enacted.

Reusable/transferrable votes: An alternative to indicating the vote via the address of the output is to represent voting choices in the OP_RETURN data of the output. This could allow tokens to be assigned back to the same user (by setting the output address as their own) so that tokens could be reused in a subsequent vote. This would streamline the process in situations where the same set of parties are expected to vote regularly, as the coordinator would not need to issue tokens for each vote. This would also provide a voting history for each member (which could be abstracted from the voter's identity as described above, if desired). This system could allow votes to be transferrable: if a voter wishes to nominate a proxy for their vote, they can transfer the token to the proxy's address instead of their own.

Weighting: Votes need not be distributed equally among voters. Tokens could be issued in a weighted manner to implement a hierarchy based, for example, on seniority or investment. The weighting could be implemented via the number of tokens issued to each user, or by issuing a single token of variable value to each voter. If tokens are issued with variable amounts, the voters may be able to divide their tokens to vote for multiple options, with a single vote having a predefined value. Voters with greater authority can therefore decide whether to vote for multiple options or one option with a large weighting, or a combination of the two.

Granular voting: If multiple tokens are issued per voter (whether this is weighted or equal between members), this gives voters the opportunity to split their vote to indicate preference. For instance, out of ten tokens a voter might choose to allocate eight to option A, zero to option B, and two to option C.

Special Tokens: Tokens could be issued that have special conditions attached to them. For example, a veto token could be issued to a senior member of the group. This could be submitted instead of (or in addition to) a regular token, and for example might have the effect of rendering the whole vote, or a chosen voting option, void. Special tokens could be identified by a vote coordinator or smart contract based on their UTXO, and usage conditions could be stated in the OP_RETURN when the token is created.

Embedding Extra Information: Including data in the OP_RETURN of each output allows for responses to be more nuanced than a straightforward choice between a set of pre-defined alternatives. This space could be used to allow optional comments on the voting choice, or more formally to require feedback from each voter. For example, in academic research many journals require a paper to be peer reviewed by several independent experts before it is accepted for publication. This could be implemented via a vote as described here, with the output address reflecting the overall recommendation (reject, revise and resubmit, accept, etc.) and the OP_RETURN providing space for full comments. The transaction representing the decision on the manuscript would not be valid until all reviewers have returned their votes and comments, and this would provide an immutable record of the decision process. The vote could also be defined such that the vote coordinator does not provide any vote options, but rather the voters provide their voting option in the OP_RETURN, for example if feedback is requested. Only a single address need be defined for the vote in this instance, with the value of all of the votes going to a single address.

Multipurpose Vote Token Transactions: the token issuing transaction can include additional information in the locking script associated with each token which is provided in the OP_RETURN of the transaction. This additional information can be the voting instructions. When the token issuing transaction is published and the user notified that the token has been issued, the program on the device of the voter accesses the voting instructions provided in the OP_RETURN and renders the appropriate information to the user. This allows the vote instructions to be stored immutably when tokens are issued.

Token/Voter Checking Software: software, such as the client application 105, on either the voter's or the vote coordinator's device may be responsible for checking that voters are eligible to vote and/or that the correct sighash flag ahs been used. To check voter eligibility, the software can check that the signature in the input-output pair is associated with a an eligible vote, for example by comparing to a list of eligible voters, or by checking that a valid token is used if tokens have been issued. The software can check the sighash flag used against a predefined sighash rule stored, for example, in the program, or against the sighash flag condition defined in the token issuing transaction. The sighash flag condition, in this scenario, can be defined in the OP_RETURN of the token issuing transaction, which is accessed by the software when checking the used sighash flag against the requirement. The input-output pair is then only transmitted to the vote-coordinator or included in the vote transaction if the criteria are satisfied so that the no input-output pair cause the vote transaction to be invalid.

The signing procedures set out above provide comprehensive examples of how multiple sighash flags can be combined to effect sophisticated signing systems. In particular, the systems described here provide individuals the opportunity to collaborate on joint transactions without forgoing their independence. They also outline how exchanging partially-formed, partially-signed transactions can serve as communication in lieu of the preliminary dialogue that is necessary when signing sighash ALL, allowing for substantially more streamlined signing procedures.

CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer program for generating an input and an output for a voting transaction for a blockchain for casting a vote, the computer program stored on a non-transitory medium which, when executed by one or more computer processors, causes the one or more processors to be configured to: receive voting instructions from a vote coordinator comprising one or more public keys defined by the vote coordinator and a set of voting options; control a display to render a user interface displaying the set of voting options; receive a user selection of one of the voting options of the set of voting options defined by a user input at the user interface; and generate an input-output pair for inclusion in a voting transaction with one or more other input-output pairs at different indexes of the voting transaction; wherein a non-signature portion of the input of the input-output pair comprises an outpoint identifying an unspent transaction output of a blockchain transaction, and a signature portion of the input comprises a signature single flag and an associated signature signing at least the non-signature portion of the input-output pair and the output of the input-output pair but not any other output of the voting transaction, and the output of the input-output pair comprises one of the one or more public keys of the voting instructions.

Statement 2. The computer system according to statement 1, wherein the one or more processors is further configured to transmit the input-output pair to the vote coordinator for generating the voting transaction.

Statement 3. The computer program according to statement 1 or statement 2, wherein each of the voting options of the set of voting options is associated with a different public key, wherein the one or more processors is further configured to determine the public key associated with the selected voting option, wherein the output comprises the determined public key.

Statement 4. The computer system according to any preceding statement, wherein the voting instructions further comprise a voting token identifying an unspent transaction output, wherein the outpoint of the input of the input-output pair identifies the voting token.

Statement 5. The computer program according to any preceding statement, wherein the input-output pair is associated with one voter of a predefined set of voters, wherein a subset of the predefined set of voters are required to generate respective input-output pairs, wherein the single signature flag is a single-anyone can pay signature flag which such that the signature signs only the input and output of the input-output pair and no other inputs or outputs of the voting transaction.

Statement 6. The computer program according to any preceding statement, wherein the one or more processors are further configured to receive a user defined input comprising information for including in an OP_RETURN, wherein the output of the input-output pair further comprises the information.

Statement 7. A computer program for generating a voting transaction for a blockchain, the computer program stored on a non-transitory medium which, when executed by one or more processors, causes the one or more processors to be configured to: receive a plurality of input-output pairs according to any preceding statement; generate a voting transaction comprising: in each of a set of vote indexes, one of the received input-output pairs; and in an authorising index, an input comprising a signature of a vote coordinator with an all signature flag, such that the signature of the vote coordinator signs all of the inputs and outputs of the voting transaction, and an output; and transmit the voting transaction to a blockchain.

Statement 8. The computer program according to statement 7, wherein the one or more processors are further configured to determine if a predefined number of input-output pairs have been received.

Statement 9. The computer program according to statement 7 or statement 8, wherein the one or more processors are configured to: generate voting instructions, wherein the process of generating the voting instructions comprises: detecting a user input initiating a vote; associating at least one public key with the vote; and render the voting instructions accessible to a user device of each voter of a set of voters.

Statement 10. The computer program according to statement 9, wherein the one or more processors are configured to generate a set of tokens, wherein each token of the set of tokens is an unspent transaction output associated with one of the voters of the set of voters.

Statement 11. The computer program according to statement 10, wherein the voting instructions comprise a token associated with a receiving voter to whose computer device the voting instructions are rendered accessible.

Statement 12. The computer program according to any of statement 7 to 11, wherein the one or more processors are further configured to access an address of each of the at least one public keys.

Statement 13. The computer program according to any of statement 7 to 12, wherein the one or more processors are further configured to access the voting transaction after the voting transaction has been validated by the blockchain node.

Statement 14. The computer program according to any of statement 7 to 13, wherein the one or more processors is further configured to determine if the unspent transaction outputs indicated by the outpoints of the received input-output pairs are sufficient to cover a transaction fee; wherein, if the unspent transaction outputs are insufficient to cover the transaction fee, the input at the authorising index comprises an outpoint indicating an unspent transaction output sufficient to cover an amount of the transaction fee which is not covered by the input-output pairs.

Statement 15. The computer program according to any preceding statement, wherein the unspent transaction output identified by the outpoint of the input of the input-output pair has a value proportional to a number of votes, wherein a single vote has a predefined value.

Statement 16. The computer program according to statement 4 or 11, or any statement dependent thereon, wherein the token is associated with a locking script defining a signature flag which must be used when signing the non-signature portion of the input comprising the token.

Statement 17. A blockchain transaction embodied on computer-readable media and comprising: an input for validly spending a spendable transaction output indicated in the input of the blockchain transaction; and at least one output comprising a piece of locking script defining a signature requirement and a required signature flag and which, when concatenated with a piece of unlocking script in a subsequent blockchain transaction, validates a signature of the unlocking script, extracts a used signature flag from the unlocking script and compares the used signature flag to the required signature flag, such that the subsequent blockchain transaction is invalid if the used signature flag does not match the required signature flag and/or the signature is invalid.

Statement 18. The blockchain transaction according to statement 17, wherein the signature flag is indicated by a last byte of the signature, wherein the step of comparing the used signature flag to the required signature flag comprises comparing the last byte of the signature with a value indicating the required signature flag defined in the locking script, wherein the used and required signature flags match if the last byte of the signature is equal to the value indicating the required signature flag.

Statement 19. The blockchain transaction according to statement 17 or statement 18, wherein the token is for use in a voting transaction, wherein the spendable output has a value proportional to a number of votes.

Statement 20. The blockchain transaction according to any of statement 17 to 19, wherein the blockchain transaction comprises an output associated with each party of a set of authorized parties, wherein the authorized parties are authorized to provide inputs and outputs for the subsequent blockchain transaction.

Statement 21. The blockchain transaction according to statement 20, wherein a subset of the set of authorized parties are required to provide inputs and outputs for the subsequent blockchain transaction, wherein the required signature flag is a single-anyone can pay signature flag for authorising only the input and output provided at a same index in the subsequent blockchain transaction.

Statement 22. The blockchain transaction according to statement 20, wherein all parties of the set of authorized parties are required to provide inputs and outputs for the subsequent blockchain transaction, wherein the required signature flag is a single-all signature flag for authorising all inputs of the subsequent transaction and only the output at the same index as the provided unlocking script.

Statement 23. The blockchain transaction according to any of statement 17 to 22, wherein the blockchain transaction is a token issuing transaction, the output of which defines a nominal amount of digital asset sufficient only to record the blockchain transaction to a blockchain.

Statement 24. A method for generating an input and an output for a voting transaction for a blockchain for casting a vote, the method comprising: receiving voting instructions from a vote coordinator comprising one or more public keys defined by the vote coordinator and a set of voting options; rendering a user interface displaying the set of voting options; receiving a user selection of one of the voting options of the set of voting options defined by a user input at the user interface; and generating an input-output pair for inclusion in a voting transaction with one or more other input-output pairs at different indexes of the voting transaction; wherein a non-signature portion of the input of the input-output pair comprises an outpoint identifying an unspent transaction output of a blockchain transaction, and a signature portion of the input comprises a signature single flag and an associated signature signing at least the non-signature portion of the input-output pair and the output of the input-output pair but not any other output of the voting transaction, and the output of the input-output pair comprises one of the one or more public keys of the voting instructions.

Statement 25. A method for generating a voting transaction for a blockchain, the method comprising: receiving a plurality of input-output pairs according to any preceding claim; generating a voting transaction comprising: in each of a set of vote indexes, one of the received input-output pairs; and in an authorising index, an input comprising a signature of a vote coordinator with an all signature flag, such that the signature of the vote coordinator signs all of the inputs and outputs of the voting transaction, and an output; and transmitting the voting transaction to a blockchain.

Statement 26. A computer system comprising at least one computing device configured to execute the computer program according to statement 1 or any statement dependent thereon and at least one computing devices configured to execute the computer program according to statement 7 or any statement dependent thereon.

Statement 27. A computer program for generating a blockchain transaction, the computer program stored on a non-transitory medium which, when executed by one or more processors, causes the one or more processors to be configured to generate the blockchain transaction comprising: an input for validly spending a spendable transaction output indicated in the input of the blockchain transaction; and at least one output comprising a piece of locking script defining a signature requirement and a required signature flag and which, when concatenated with a piece of unlocking script in a subsequent blockchain transaction, validates a signature of the unlocking script, extracts a used signature flag from the unlocking script and compares the used signature flag to the required signature flag, such that the subsequent blockchain transaction is invalid if the used signature flag does not match the required signature flag and/or the signature is invalid.

APPENDIX A

This section explains the SCRIPT code that can be added before a standard P2PKH locking script to create an additional check that when the UTXO is spent it is signed using a particular sighash flag.

A digital signature created using ECDSA and encoded for Bitcoin transactions begins with a byte that indicates the length of the signature sequence, and ends with a byte that indicates the sighash flag. For example, a signature that was 47 bytes in total and signed with the SINGLE IACP flag would take the form 0x47<sig>83. To check whether a particular sighash flag has been used when signing, we wish to check that the final byte of the signature is equal to a certain value.

In this example we assume that the locking script that follows the sighash check code is a P2PKH script. The unlocking script would therefore take the form <sig><P>, and both items are pushed to the stack before the locking script is executed.

The following lines represent the items on the stack in order from bottom (left) to top (right), with each item enclosed in [ ]. Indented blue text indicates the next OP code. The first time each OP code is used it is followed by a brief description of its function.

The unlocking script pushed the signature and associated public key to the stack:

```
[0x47<sig>83] <P>
    OP_TOALTSTACK    Sends item on top of the stack to the alt
                     stack
[0x47<sig>83]
    OP_DUP           Duplicates top item on stack
[0x47<sig>83] [0x47<sig>83]
    OP_1 Pushes the value 1 to the stack
[0x47<sig>83] [0x47<sig>83] [0x01]
    OP_SPLIT         Splits the penultimate item on the stack into two
                     items at the position (in bytes) indicated by top
                     stack item
[0x47<sig>83] [0x47] [<sig>83]
    OP_SWAP          Reverses the positions of the two top stack items
[0x47<sig>83] [<sig>83] [0x47]
    OP_2 Pushes the value 2 to the stack
[0x47<sig>83] [<sig>83] [0x47] [0x02]
    OP_SUB           Subtracts the value of the top stack item from the
                     penultimate item
[0x47<sig>83] [<sig>83] [0x45]
    OP_SPLIT
[0x47<sig>83] [<sig>] [0x83]
    OP_NIP           Removes the penultimate item from the stack
[0x47<sig>83] [0x83]
    <0x83>           (Not OP code - indicates pushing the item [0x83] to
                     the stack)
[0x47<sig>83] [0x83] [0x83]
    OP_EQUALVERIFY   Checks whether the top two stack items
                     are identical, if yes continues evaluating
                     script, if not, flags the execution as a
                     failure
[0x47<sig>83]
    OP_FROMALTSTACK  Takes top item from alt stack back to main
                     stack
[0x47<sig>83] <P>
```

The final state leaves the signature and public key on the stack, as is necessary for the standard P2PKH script to validate.

The invention claimed is:

1. A computer program for generating an input and an output for a voting transaction for a blockchain for casting a vote, the computer program stored on a non-transitory computer-readable medium which, when executed by one or more computer processors, causes the one or more processors to be configured to:
- receive voting instructions from a vote coordinator comprising one or more public keys defined by the vote coordinator and a set of voting options;
- control a display to render a user interface displaying the set of voting options;
- receive a user selection of one of the voting options of the set of voting options defined by a user input at the user interface; and
- generate an input-output pair for inclusion in a voting transaction with one or more other input-output pairs at different indexes of the voting transaction;
- wherein a non-signature portion of the input of the input-output pair comprises an outpoint identifying an unspent transaction output of a blockchain transaction, and a signature portion of the input comprises a signature single flag and an associated signature signing at least the non-signature portion of the input-output pair and the output of the input-output pair but not any other output of the voting transaction, and the output of the input-output pair comprises one of the one or more public keys of the voting instructions.

2. The computer program according to claim 1, wherein the one or more processors is further configured to transmit the input-output pair to the vote coordinator for generating the voting transaction.

3. The computer program according to claim 1, wherein each of the voting options of the set of voting options is associated with a different public key, wherein the one or more processors is further configured to determine the public key associated with the selected voting option, wherein the output comprises the determined public key.

4. The computer program according to claim 1, wherein the voting instructions further comprise a voting token identifying an unspent transaction output, wherein the outpoint of the input of the input-output pair identifies the voting token.

5. The computer program according to claim 4, or any claim dependent thereon, wherein the token is associated with a locking script defining a signature flag which must be used when signing the non-signature portion of the input comprising the token.

6. The computer program according to claim 1, wherein the input-output pair is associated with one voter of a predefined set of voters, wherein a subset of the predefined set of voters are required to generate respective input-output pairs, wherein the single signature flag is a single-anyone can pay signature flag which such that the signature signs only the input and output of the input-output pair and no other inputs or outputs of the voting transaction.

7. The computer program according to claim 1, wherein the one or more processors are further configured to receive a user-defined input, wherein the output of the input-output pair further comprises information of the user-defined input and an opcode that invalidates the output.

8. The computer program according to claim 1, wherein the unspent transaction output identified by the outpoint of the input of the input-output pair has a value proportional to a number of votes, wherein a single vote has a predefined value.

9. A computer program for generating a voting transaction for a blockchain, the computer program stored on a non-transitory computer-readable medium that, when executed by one or more processors, causes the one or more processors to be configured to:
- receive voting instructions from a vote coordinator comprising one or more public keys defined by the vote coordinator and a set of voting options;
- control a display to render a user interface displaying the set of voting options;
- receive a user selection of one of the voting options of the set of voting options defined by a user input at the user interface;
- generate an input-output pair for inclusion in a voting transaction with one or more other input-output pairs at different indexes of the voting transaction, wherein a non-signature portion of the input of the input-output pair comprises an outpoint identifying an unspent transaction output of a blockchain transaction, and a signature portion of the input comprises a signature single flag and an associated signature signing at least the non-signature portion of the input-output pair and the output of the input-output pair but not any other output of the voting transaction, and the output of the input-output pair comprises one of the one or more public keys of the voting instructions;
- generate a voting transaction comprising:
  - in each of a set of vote indexes, one of the received input-output pairs; and
  - in an authorising index, an input comprising a signature of a vote coordinator with an all signature flag, such that the signature of the vote coordinator signs all of the inputs and outputs of the voting transaction, and an output; and
- transmit the voting transaction to a blockchain.

10. The computer program according to claim 9, wherein the one or more processors are further configured to determine if a predefined number of input-output pairs have been received.

11. The computer program according to claim 9, wherein the one or more processors are configured to:
- generate voting instructions, wherein the process of generating the voting instructions comprises:
  - detecting a user input initiating a vote;
  - associating at least one public key with the vote; and
- render the voting instructions accessible to a user device of each voter of a set of voters.

12. The computer program according to claim 11, wherein the one or more processors are configured to generate a set of tokens, wherein each token of the set of tokens is an unspent transaction output associated with one of the voters of the set of voters.

13. The computer program according to claim 12, wherein the voting instructions comprise a token associated with a receiving voter to whose computer device the voting instructions are rendered accessible.

14. The computer program according to claim 13, wherein the token is associated with a locking script defining a signature flag which must be used when signing the non-signature portion of the input comprising the token.

15. The computer program according to claim 11, wherein the one or more processors are further configured to access an address of each of the at least one public keys.

16. The computer program according to claim 9, wherein the one or more processors are further configured to access the voting transaction after the voting transaction has been validated by a blockchain node.

17. The computer program according to claim 9, wherein the one or more processors is further configured to determine if the unspent transaction outputs indicated by the outpoints of the received input-output pairs are sufficient to cover a transaction fee;

wherein, if the unspent transaction outputs are insufficient to cover the transaction fee, the input at the authorising index comprises an outpoint indicating an unspent transaction output sufficient to cover an amount of the transaction fee which is not covered by the input-output pairs.

18. The computer program according to claim 9, wherein the unspent transaction output identified by the outpoint of the input of the input-output pair has a value proportional to a number of votes, wherein a single vote has a predefined value.

19. A method for generating an input and an output for a voting transaction for a blockchain for casting a vote, the method comprising:
- receiving voting instructions from a vote coordinator comprising one or more public keys defined by the vote coordinator and a set of voting options;
- rendering a user interface displaying the set of voting options;
- receiving a user selection of one of the voting options of the set of voting options defined by a user input at the user interface; and
- generating an input-output pair for inclusion in a voting transaction with one or more other input-output pairs at different indexes of the voting transaction;
- wherein a non-signature portion of the input of the input-output pair comprises an outpoint identifying an unspent transaction output of a blockchain transaction, and a signature portion of the input comprises a signature single flag and an associated signature signing at least the non-signature portion of the input-output pair and the output of the input-output pair but not any other output of the voting transaction, and the output of the input-output pair comprises one of the one or more public keys of the voting instructions.

20. A computer program for generating a blockchain transaction, the computer program stored on a non-transitory computer-readable medium which, when executed by one or more processors, causes the one or more processors to be configured to generate the blockchain transaction comprising:
- an input for validly spending a spendable transaction output indicated in the input of the blockchain transaction; and
- at least one output comprising a piece of locking script defining a signature requirement and a required signature flag and which, when concatenated with a piece of unlocking script in a subsequent blockchain transaction, validates a signature of the unlocking script, extracts a used signature flag from the unlocking script and compares the used signature flag to the required signature flag, such that the subsequent blockchain transaction is invalid if the used signature flag does not match the required signature flag and/or the signature is invalid.

* * * * *